United States Patent
Isogai et al.

(10) Patent No.: US 8,045,182 B2
(45) Date of Patent: Oct. 25, 2011

(54) LOCATION DETECTION APPARATUS

(75) Inventors: Toshiki Isogai, Nagoya (JP); Hisanaga Matsuoka, Okazaki (JP); Mitsuyasu Matsuura, Chiryu (JP); Mitsuru Fujita, Toyohashi (JP); Motoi Oda, Gamagori (JP)

(73) Assignees: Nippon Soken, Inc., Nishio (JP); DENSO CORPORATION, Kariya (JP)

( * ) Notice: Subject to any disclaimer, the term of this patent is extended or adjusted under 35 U.S.C. 154(b) by 208 days.

(21) Appl. No.: 12/461,480

(22) Filed: Aug. 13, 2009

(65) Prior Publication Data

US 2010/0053637 A1    Mar. 4, 2010

(30) Foreign Application Priority Data

Aug. 29, 2008 (JP) ................... 2008-221516

(51) Int. Cl.
*G01B 11/14* (2006.01)
(52) U.S. Cl. ........................ 356/614; 356/615
(58) Field of Classification Search .......... 356/614–624, 356/239.2–239.8, 237.1–237.6, 4.01; 340/435, 340/436, 438; 250/235–236, 224; 180/167–169, 180/271
See application file for complete search history.

(56) References Cited

U.S. PATENT DOCUMENTS

| 5,745,050 | A | 4/1998 | Nakagawa |
| 5,808,727 | A | 9/1998 | Katayama |
| 7,602,485 | B2 * | 10/2009 | Mori ..................... 356/239.2 |
| 2005/0024625 | A1 | 2/2005 | Mori et al. |

FOREIGN PATENT DOCUMENTS

JP    A-2008-70199    3/2008

OTHER PUBLICATIONS

Office Action mailed Jun. 8, 2010 from the Japan Patent Office in the corresponding patent application No. 2008-221516 (and English translation).

* cited by examiner

*Primary Examiner* — Tri T Ton
(74) *Attorney, Agent, or Firm* — Posz Law Group, PLC

(57) ABSTRACT

A location detection apparatus is disclosed that includes: a light source; a light output side reflector having a reflecting surface for reflecting light from the light source to a space; a rotation mechanism for rotating the light output side reflector; a first light receiving element for receiving the light reflected from an object existing in the space; a light reception side reflector for reflecting the light from the object to the first light receiving element; a second light receiving element for receiving the light from the light output side reflector; a light conductor for conducting the light reflected from or transmitted through the reflecting surface toward the second light receiving element when the light output side reflector is in a predetermined position; and a rotational position detector that detects rotational position of the light output side reflector based on a detection result of the second light receiving element.

7 Claims, 6 Drawing Sheets

LOCATION DETECTION APPARATUS

CROSS REFERENCE TO RELATED APPLICATION

The present application is based on Japanese Patent Application No. 2008-221516 filed on Aug. 29, 2008, disclosure of which is incorporated herein by reference.

BACKGROUND OF THE INVENTION

1. Field of the Invention

The present invention relates to a location detection apparatus.

2. Description of Related Art

Patent Document 1 proposes a range sensor as one technique for detecting a distance to and a direction to an object existing in an external space. The range sensor includes a light source, a projection mirror, a light reception mirror, and a light receiving element. The projection mirror and the light reception mirror are rotatable together. The light from the light source is incident on the projection mirror along a rotation axis, and the projection mirror reflects the incident light to the external space. Then, the light may be reflected by an irradiated object (i.e., an object to be detected) existing in the external space, and the light from the object is reflected by the light reception mirror and conducted to the light receiving element. Based on a result of the light reception by the light receiving element, the range sensor detects a distance to and a direction to the object.

Patent Document 1: JP-2005-55226A corresponding to US-2005/0024625A

According to the technique disclosed in the Patent Document 1, however, rotational position of the light reception mirror is detected by a resolver or a rotary encoder, which brings a difficulty associated with an increase in size of the range sensor. Further, the technique proposed in Patent Document 1 employs a relatively large scale configuration where a hollow structure motor drives the rotation axis, which is integrated with a cover of the light reception mirror etc. Thus, there arises a difficulty associated with an increase in size of the resolver and the rotary encoder, and inhibition of the range sensor from having a smaller size and lighter weight as a whole.

SUMMARY OF THE INVENTION

In view of the above and other difficulties, it is an objective of the present invention to provide a location detection apparatus capable of having a small and simple configuration.

According to a first aspect of the present invention, there is provided a location detection apparatus for detecting an object existing in a space. The location detection apparatus includes: a light source that generates light having a directivity for detection; a light output side reflector that is rotatable and has a reflecting surface for reflecting at least a part of the light from the light source to the space; a rotation mechanism that rotates the light output side reflector around a predetermined rotation axis; a drive element that drives the rotation mechanism; a first light receiving element that receives the light reflected from the object existing in the space; a light reception side reflector that reflects the light from the object to the first light receiving element when the object is irradiated with the light reflected from the reflecting surface of the light output side reflector; a second light receiving element that receives and detects the light from the light output side reflector, and provides a detection result; a light conductor that conducts the light reflected from or transmitted through the reflecting surface of the light output side reflector, toward the second light receiving element when rotational position of the light output side reflector becomes a predetermined position; and a rotational position detector that detects the rotational position of the light output side reflector based on the detection result of the second light receiving element.

According to the above location detection apparatus, since the location detection apparatus includes the above-described second light receiving element and the above-described light conductor, the second light receiving element can well receive the light each time the rotational position of the light output side reflector becomes the predetermined position. It is therefore possible to detect a reference position without employing a complicated configuration, the reference position providing a reference for the detecting of the rotational position. Moreover, since the rotational position of the light output side reflector is detected based on the detection result of the second light receiving element or a result of the detection of the reference position, it is possible provide a simplified and downsized configuration for detecting the rotational position of the light output side reflector, and as a result, it is possible to provide the location detection apparatus with a smaller size and a lighter weight as a whole.

According to a second aspect of the present invention, there is provided a location detection apparatus for detecting an object existing in a space. The location detection apparatus includes: a light source that generates light having a directivity for detection; a light output side reflector that is rotatable and has a reflecting surface for reflecting at least a part of the light from the light source to the space; a rotation mechanism that rotates the light output side reflector around a predetermined rotation axis; a drive element that drives the rotation mechanism; a light receiving element that receives the light reflected from the object existing in the space; a light reception side reflector that reflects the light from the object to the light receiving element when the object is irradiated with the light reflected from the reflecting surface of the light output side reflector; a light conductor that conducts the light reflected from or transmitted through the reflecting surface of the light output side reflector toward the light receiving element when rotational position of the light output side reflector becomes a predetermined position; and a rotational position detector that detects the rotational position of the light output side reflector based on the detection result of the light receiving element.

According to the above location detection apparatus, it is possible to detect a reference position without employing a complicated configuration, the reference position providing a reference for detecting the rotational position. In particular, since the light receiving element can play both roles in detecting the object in the space and in detecting the reference position, it is possible to further simplify a configuration for detecting the rotational position of the light output side reflector, and as a result, it is possible to provide a location detection apparatus with a smaller size and a lighter weight as whole.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EXEMPLARY EMBODIMENTS

The exemplary embodiments are described below with reference to the accompanying drawings.

First Embodiment

Figure 1:
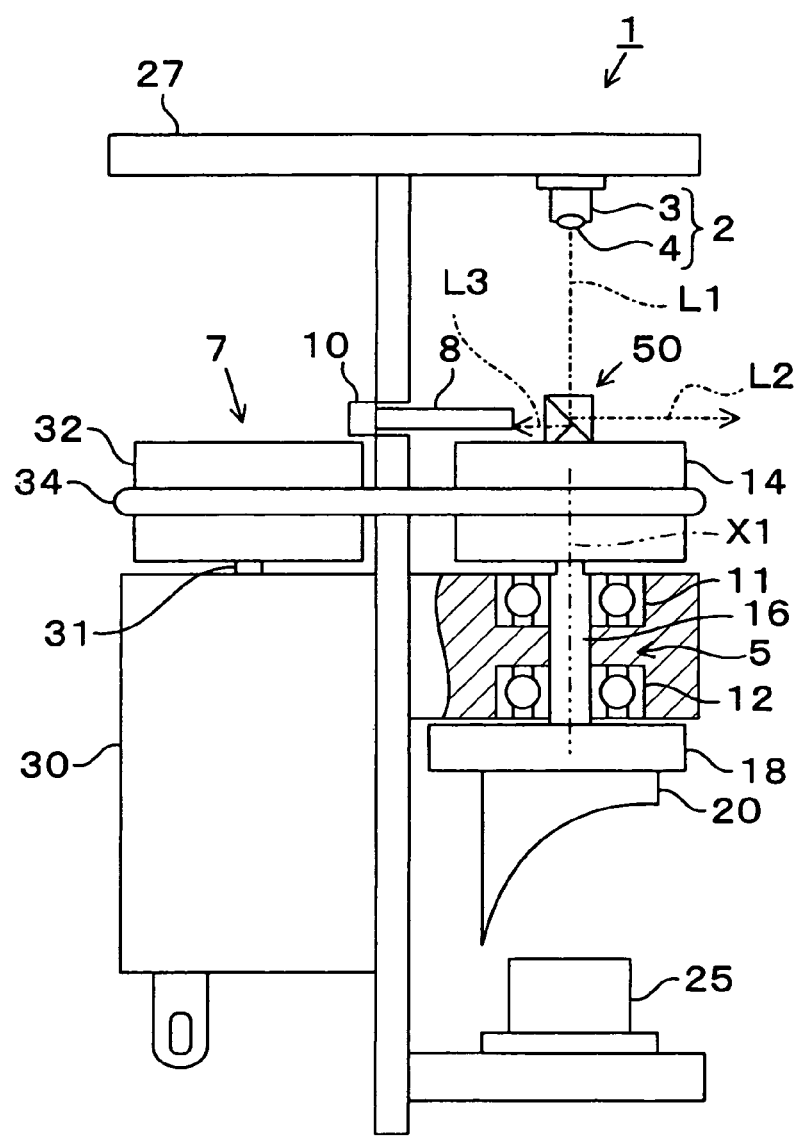
FIG. 1 is a diagram illustrating a location detection apparatus according to a first embodiment.
Figure 2:
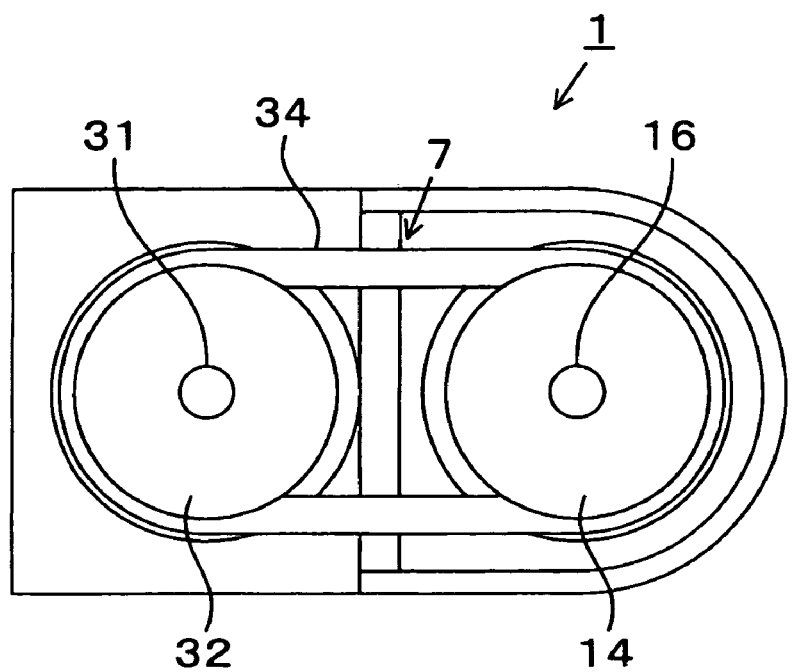
FIG. 2 is a diagram illustrating a transmission mechanism.
Figure 3:
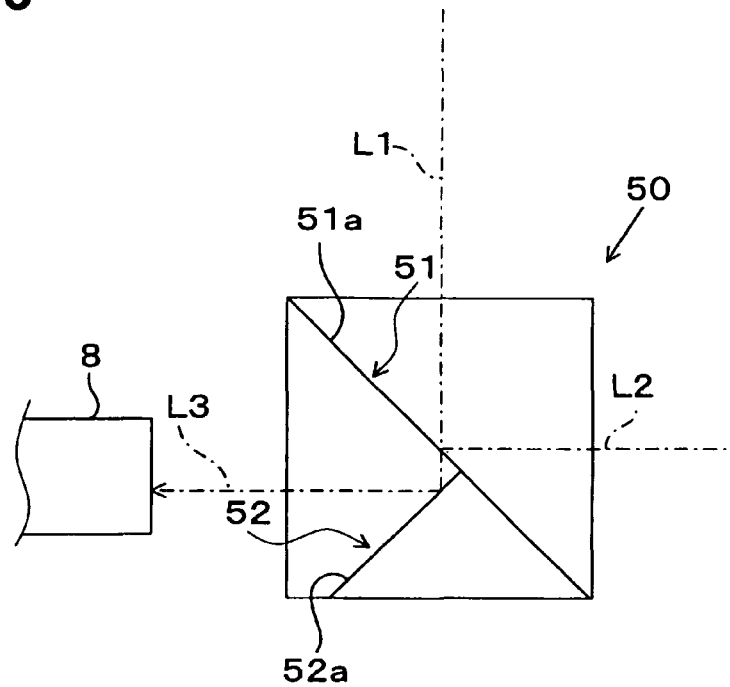
FIG. 3 is a diagram illustrating a beam splitter.
Figure 4:
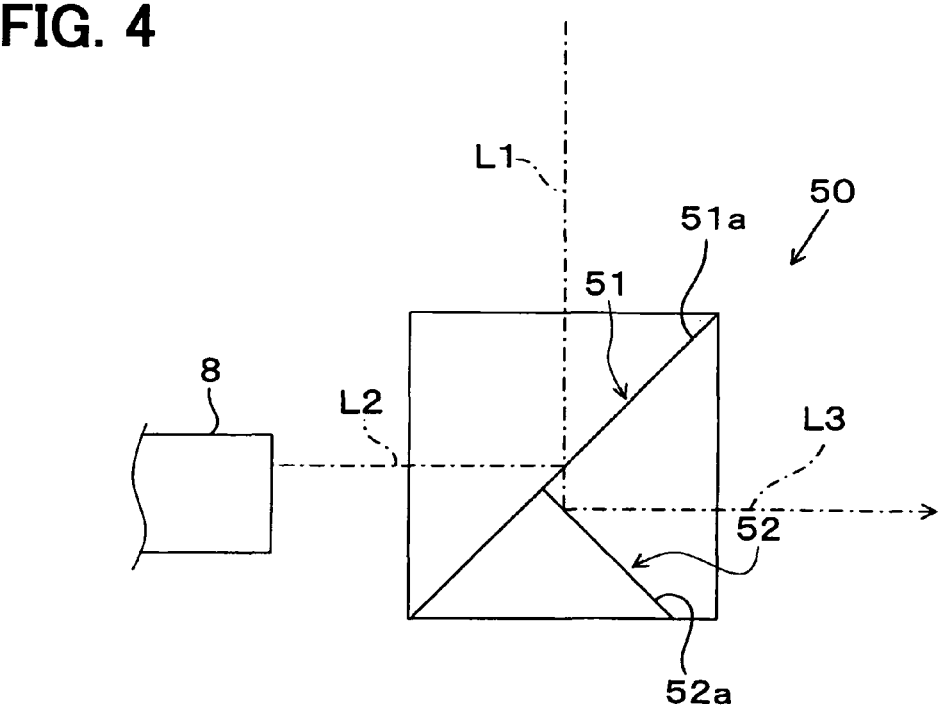
FIG. 4 is a diagram illustrating the beam splitter that is rotated 180 degrees from a position illustrated in FIG. 3.

A first embodiment is described below. FIG. 1 illustrates a location detection apparatus according to the first embodiment. FIG. 2 illustrates a transmission mechanism of a location detection apparatus. FIG. 3 illustrates a beam splitter of a location detection apparatus and illustrates lights spited by the beam splitter. FIG. 4 illustrates the beam splitter that is rotated 180 degrees from the rotational position of the beam splitter 50 illustrate in FIG. 3.

As shown in FIG. 1, the location detection apparatus 1 according to the present embodiment includes a light source 2 and a beam splitter 50. The light source 2 outputs light L1 for detection. The beam splitter 50 has a reflecting surface 51a (see FIG. 3) for reflecting a part the light L1 from the light source 2 to a space. The light source 2 includes a laser diode 3 and a collective lens 4 for collecting a laser beam outputted from the laser diode 3. As the light L1 for detection, the collective lens 4 outputs the laser light having directivity. In the location detection apparatus 1, the light source 2 and the beam splitter 50 face each other. The light L1 outputted from the light source 2 enters the beam splitter 50 in an incident direction, which is a direction of the below-described rotation axis X1.

As shown in FIGS. 1 and 3, the beam splitter 50 splits the light L1 from the light source 2 into two lights L2, L3, both of which travel in directions perpendicular to the rotation axis X1. More specifically, as shown in FIG. 3, the beam splitter 50 includes a first reflecting portion 51 and a second reflecting portion 52. The first reflecting portion 51 has a reflecting surface 51a inclined with respect to the rotation axis X1. The second reflecting portion 52 has a reflecting surface 52a inclined with respect to the rotation axis X1. The reflecting surface 51a of the first reflecting portion 51 reflects a part of the light L1 from the light source 2, thereby outputting light L2 whose direction is perpendicular to the rotation axis X1.

The reflecting surface 52a of the second reflecting portion 52 reflects at least a part of the light transmitted through the first reflecting portion 51, thereby outputting light L3 whose direction is perpendicular to the rotation axis X1 and different from the direction of the light L2. As illustrated in FIG. 3, the reflecting surface 51a and the reflecting surface 52a are perpendicular to each other as an exemplary positional relationship, so that the light L2 and the light L3 travel in opposite directions. The beam splitter 50 according to the present embodiment is an example of a light output side reflector functioning as light output side reflecting means.

The location detection apparatus 1 includes a rotation mechanism 5. The rotation mechanism 5 includes a pulley 14, an axis member 16 connected with the pulley 14, and a pair of bearings 11, 12 rotatably supporting the axis member 16. The beam splitter 50 is fixed to the pulley 14. The rotation mechanism 5 enables the beam splitter 50 to rotate about the rotation axis X1. In the above described configuration, an axis of rotation of the axis member 16 matches the rotation axis X1. Further, an optical axis of the light L1 and the rotation axis X1 is on the same line. Accordingly, the pulley 14 connected with the axis member 16 and the beam splitter 50 fixed to the pulley 14 are rotatable around the optical axis of the light L1.

The reflecting surface 51a of the first reflecting portion 51 of the beam splitter 50 is inclined at an angle of 45 degrees with respect to the rotation axis X1. In other words, an angle between the reflecting surface 51a and the optical axis of the incident light L1 is 45 degrees. The location detection apparatus 1 is configured so that an angle between the reflecting surface 51a and the optical axis of the incident light L1 is always kept at 45 degrees in any rotational position of the beam splitter 50 when the beam splitter 50 is rotated around the rotation axis X1. Thus, an optical axis direction of the light L2 out-coming from the reflecting surface 51a is always kept perpendicular to the optical axis of the incident light L1 on the beam splitter 50. When the rotation axis X1 matches a vertical direction, the light L2 is scanned in a horizontal direction.

The location detection apparatus 1 further includes a concave mirror 20 and a photodiode 25, which face each other and are located on an opposite side of the beam splitter 50 from the light source 2. The concave mirror 20 is fixed to the axis member 16 via a support member 18 and is rotatable about the rotation axis X1 together and integrally with the axis member 16 and the beam splitter 50 connected with the axis member 16. The concave mirror 20 reflects light from one side thereof so that the reflected light travels in a direction toward the photodiode 25. More specifically, the concave mirror 20 reflects the light from the space, which is to be irradiated with the light L2 reflected from the reflecting surface 51a of the beam splitter 50. When an object existing in the space is irradiated with the light L2, the concave mirror 20 reflects the light from the object to the photodiode 25. A reflecting surface of the concave mirror 20 includes a paraboloidal surface, which is obtained by rotating a parabolic cover around an axis. A light reception surface of the photodiode 25 is located at the focus of the paraboloidal surface and can efficiently collect the reflected light.

The photodiode 25 detects the reflected light, which is the light L2 reflected from the object, and converts the detected light into an electrical signal. In the present embodiment, the concave mirror 20 reflects a predetermined range of the light reflected from an object, and, the photodiode 25 receives the light reflected from the concave mirror 20. The photodiode 25 is an example of a first light receiving element functioning as first light reception means. The concave mirror 20 is an example of a light reception side reflector functioning as light reception reflecting means.

The location detection apparatus 1 in FIG. 1 includes a motor 30 for driving the rotation mechanism 5. For example, the motor 30 is a direct current (DC) motor and has a rotatable drive axis 31, which is driven and controlled by a known motor control circuit (not shown). The drive axis 31 of the motor 30 is rotatable around an axis of rotation that is parallel to and spaced apart from the rotation axis X1.

As shown in FIGS. 1 and 2, the drive axis 31 of the motor 30 is fixed to the pulley 32. The driving force of the pulley 32 is transmitted to the pulley 14 through a belt 34, and integrally rotates a light output reception unit, which includes the light output reception unit including the pulley 14, the beam splitter 50, the axis member 16, the support member 18 and the concave mirror 20. The location detection apparatus 1 includes a transmission mechanism 7 having the pulley 32, the pulley 14 and the belt 34. The transmission mechanism 7 transmits the drive force of the drive axis 31 of the motor 30 to the light output receive unit.

The location detection apparatus 1 of the present embodiment further includes a light reception sensor 10 and a light conducting member. The light reception sensor 10 is, for example, a photodiode, and is an example of a second light receiving element functioning as second light reception means. The light conducting member conducts light to the light reception sensor 10, and is an example of a light conductor or light conducting means. More specifically, the light conducting member includes the second reflecting portion 52 of the beam splitter 50 and an optical fiber 8 for conducting light from the beam splitter 50 to a predetermined location. The light conducting member functions to conduct the light L3 to the light reception sensor 10 when rotational position of the beam splitter becomes a predetermined position (e.g., a rotational position illustrated in FIGS. 1 and 3).

As shown in FIG. 3, the reflecting surface 52a of the second reflecting portion 52 reflects the light transmitted through the reflecting surface 51a of the first reflecting portion 51. The reflecting surface 52a of the second reflecting portion 52 is inclined at an angle of 45 degrees with respect to the rotation axis X1, in other words, inclined at an angle of 45 degrees with respect to the optical axis of the light L1 transmitted through the reflecting surfaces 51a and 52a. An angle between the reflecting surface 52a and the optical axis of the light L1 is always kept at 45 degrees in any rotational position of the beam splitter 50 when the beam splitter 50 is rotated about the rotation axis X1. Thus, a direction of the light coming from the reflecting surface 52a is always perpendicular to the optical axis of the incident light L1 on the beam splitter 50. When the rotation axis X1 matches a vertical direction, the light L3 travels in a horizontal direction.

As shown in FIG. 3, a light inlet part 8a of the optical fiber 8 is located on a virtual plane which the light L3 travels on and which is perpendicular to the rotation axis X1. The Light L3 transmitted through the reflecting surface 51a and reflected from the reflecting surface 52a enters the light inlet part 8a when the rotational position of the beam splitter 50 becomes the predetermined position (e.g., the position illustrated in FIGS. 1 and 3. The light incident on the light inlet part 8a is conducted to the light reception sensor 10 through the optical fiber 8 and is received by the light reception sensor 10.

As shown in FIG. 4, when the beam splitter 50 is rotated 180 degrees around the rotation axis X1 from the predetermined position (referred to also as a first position and is for example the rotational position illustrated in FIGS. 1 and 3), the beam splitter 50 is in a second position. When the beam splitter 50 is in the second position, the light inlet part 8a of the optical fiber 8 is located on a path of the light L2 reflected from the reflecting surface 51a of the first reflecting portion 51, and the light L2 incident on the light inlet part 8a is conducted to the light reception sensor 10 through the optical fiber 8 and is received by the light reception sensor 10. Since the beam splitter 50 splits the incident light into two lights traveling in opposite directions, the light reception sensor 10 can receive the light each time the beam splitter 50 is rotated 180 degrees.

As shown in FIG. 1, the location detection apparatus 1 includes a control board 27. The control board 27 is equipped with a control circuit (not shown) for wholly controlling the location detection apparatus 1, a memory (not shown), a drive circuit (not shown) for driving the laser diode 3, a drive circuit (not shown) for driving the motor, and the like. The control circuit for wholly controlling the location detection apparatus 1 may be a microcomputer having a CPU. The control circuit of the control board 27 outputs a drive signal to the drive circuit for driving the laser diode 3, obtains light reception signals from the photodiode 25 and the light reception sensor 10, and performs various computations.

Operation of the location detection apparatus 1 is described below.

The control circuit and the drive circuit drive the laser diode 3. When the light L1 is outputted, the light L1 is incident on the beam splitter 50. The first reflecting portion 51 (see FIG. 1) reflects a part of the incident light L1 in a direction toward the space.

The light L2 reflected from the first reflecting portion 51 (see FIG. 3) may be reflected by an object existing in the space, and a part of the light reflected from the object is incident on the concave mirror 20. The concave mirror 20 reflects the incident light, which had been reflected by the object, in a direction toward the photodiode 25. When receiving the light from the concave mirror 20, the photodiode 25 outputs an electrical signal that depends on an amount of the light received. According to the above described configuration, it is possible to, for example, obtain a distance to the object by measuring a period between a time of start of driving the laser diode 3 and a time of detection of the object reflecting light by the photodiode 25. In obtaining the distance, it is possible to obtain a direction to the object by detecting rotational position of the beam splitter 50.

The rotational position of the beam splitter 50 can be obtained based on a light detection result of the light reception sensor 10 in the following ways. When the rotational position of the beam splitter 50 becomes the predetermined position (e.g., FIGS. 1 and 3), the light L3 enters the optical fiber 8 and is received by the light reception sensor 10. A reference position is set to such a rotational position where the light reception sensor 10 receives the light L3. The rotational position of the beam splitter 50 is detected based on the reference position.

Various configurations can be used to obtain the rotational position by setting the reference position to a certain rotational position where the light reception sensor 10 can receive the light L3. For example, the following configuration may be used. A one-rotation pulse signal, which corresponds to 360 degree rotation, is generated each time the light reception sensor 10 receives the light L3. The one-rotation pulse signal is frequency-divided by phased-locked-loop (PLL) or the like, and thereby, a pulse signal having pulses that respectively correspond to multiple rotational positions is generated. The control circuit performs computation based on the pulse signal to calculate the rotational position. The above described manner of detecting the rotational position is also applicable to a configuration in which the light L2 from the first reflecting portion 51 does not enter the optical fiber 8.

Alternatively, the light reception sensor 10 receives not only the light L3 from the second reflecting portion 52 but also the light L2 from the first reflecting portion 51, and the rotational position of the beam splitter 50 may be detected based on the received lights L2 and L3. For example, a half-rotation pulse signal, which corresponds to 180 degrees rotation, may be generated each time the light reception sensor 10 receives the light L2 or the light L3. The half-rotation pulse signal may be frequency-divided by PLL or the like, and thereby, a pulse signal having multiple pulses that respectively correspond to multiple rotational positions may be generated. The control circuit performs computation based on the pulse signal to calculate the rotational position.

In the present embodiment, the control board 27, more particularly the control circuit of the control board 27, detects the rotational position of the light output side reflector, and is an example of a rotational position detector functioning as rotation detection means.

The present embodiment provides a location detection apparatus with the following advantages.

The location detection apparatus 1 includes the optical fiber 8, through which the light transmitted through the reflecting surface 51a of the beam splitter 50 is conducted to the light reception sensor 10 when the beam splitter 50 is in the predetermined position. Thus, the light reception sensor 10 can receive the light L3 each time the rotational position of the beam splitter 50 becomes the predetermined rotational position, and the reference position providing a reference for the rotational location detection can be detected in a simple manner without the use of a complicated configuration. Moreover, since the rotational position of the beam splitter 50 is detected based on a result of light reception in the light reception sensor 10 and a detection result of the reference position, it is possible to simplify and downsize a configuration for detecting the rotational position of the beam splitter 50, and as a result, it is possible to provide the location detection apparatus 1 with a small size and a light weight as a whole.

Moreover, since the light reception side reflector includes the concave mirror 20, the light reception side reflector can collect and reflect the reflected light from a detection target object from a broad range, and so that the reflected light converges at the photodiode 25. The use of the concave mirror can suppress the number of components.

Moreover, the optical fiber 8 acting as a light conductor or light conducting means is configured so that the optical fiber 8 is located on a path of the light from the beam splitter 50 that is in the predetermined rotational position. Accordingly, since the light from the beam splitter 50 can enter the optical fiber 8 and can be conducted toward the light reception sensor 10 when the beam splitter 50 is in the predetermined rotational position, the light reception sensor 10 can receive the light from the beam splitter 50 while an influence of ambient light is being reduced.

The beam splitter 50 includes the second reflecting portion 52, which reflects the light transmitted through the first reflecting portion 51 in a direction different from a direction of the light reflected from the first reflecting portion 51. The light reflected from the second reflecting portion 52 is used for detecting the rotational position. According to the above configuration, while the light reflected from the first reflecting portion 51 is being used for detecting an object, the light reflected from the second reflecting portion 52 in the different direction can be used for detecting the rotational position. In other words, it is possible to perform both of the detection of an object and the detection of rotational position by utilizing the lights that are branched in two different directions at the light output side reflector.

Moreover, the light reception sensor 10 receives the light L3 reflected from the second reflecting portion 52 when the rotational position of the beam splitter 50 becomes the predetermined rotational position The light reception sensor 10 receives the light reflected from the first reflecting portion 51 when the rotational position of the beam splitter 50 becomes the second rotational position, which is different from the first rotational position, i.e., the predetermined rotational position. According to the above configuration, the rotational position can be detected by using not only the light L3 reflected from the second reflecting portion 52 but also the light L2 reflected from the first reflecting portion 51. It is therefore possible to increase detection accuracy without the use of a large and complicated configuration. It should be noted that the light L2 is also used for detecting an object.

Moreover, the light output reception unit, in which the concave mirror 20 and the beam splitter 50 may be integrally coupled with each other, is rotatable about the rotation axis X1. According to this configuration, an orientation of the beam splitter and that of the concave mirror 20 can match each other. Further, since the light output reception unit is equipped with the transmission mechanism 7 for transmitting the drive force of the drive axis 31 of the motor 30, it is possible to downsize the motor 30 or the drive axis 31 compared to a configuration where a drive axis 31 of a motor 30 is a part of the light output reception unit.

Second Embodiment

A second embodiment is described below.

Figure 5:
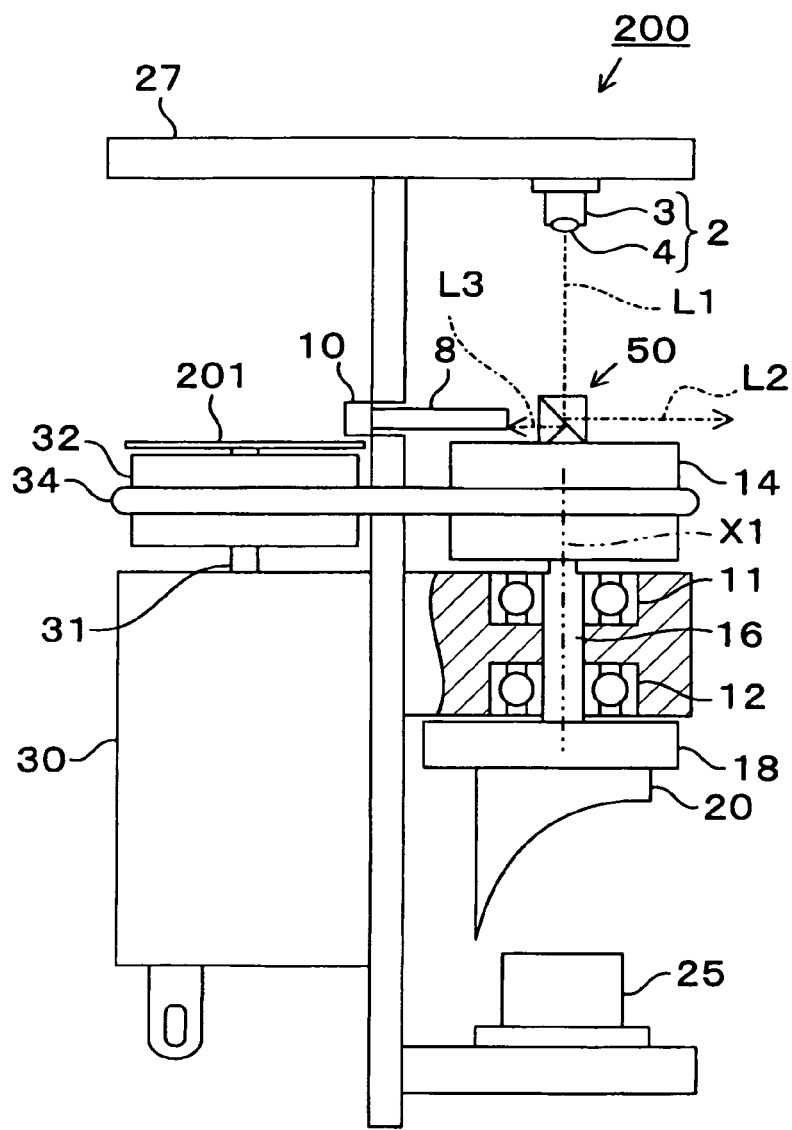
FIG. 5 is a diagram illustrating a location detection apparatus according to a second embodiment.

FIG. 5 illustrates a location detection apparatus 200 according to the second embodiment. The second embodiment is different from the first embodiment in that, in the second embodiment, a rotary encoder is attached to a drive axis 31 of a motor 30.

As shown in FIG. 5, the location detection apparatus 200 includes a circular plate 201. The circular plate 201 is attached to the drive axis 31 of the motor 30 and is rotatable integrally with the drive axis 31. The circular plate 201 may be a slit circular plate, which is used in a known rotary-encoder and has slits along an outer circumference thereof, wherein the splits are formed at predetermined intervals, for example, at 4 degrees angular intervals. A light output element and a light reception element (not shown) are disposed around the circular plate 201 to detect the slits. The rotary encoder of the location detection apparatus 200 includes the circular plate 201, the light output element and the light reception element.

In the present embodiment, the manner of detecting the light from the beam splitter 50 as described in the first embodiment is used to obtain the reference position. In addition, the rotary encoder is used to obtain the rotational position. More specifically, the reference rotational position of the beam splitter 50 is detected based on a light reception result of the light reception sensor 10. In addition, the rotary encoder detects an amount of rotation of the beam splitter 50 with respect to the detected reference rotational position. The rotational position can be specified by counting the number of times the slit is detected after the detection of the reference rotational position, for instance.

In the configuration of FIG. 5, the slits of the circular plate 201 are detected and the detection result is used for specifying an amount of rotation of the beam splitter 50 with respect to the reference position. To improve a detection resolution more than a slit interval, a time interval between the detections of slits is divided into multiple periods. e.g., sixteen periods, and each of the multiple periods is detected to provide the high resolution.

Third Embodiment

A third embodiment is described below.

Figure 6:
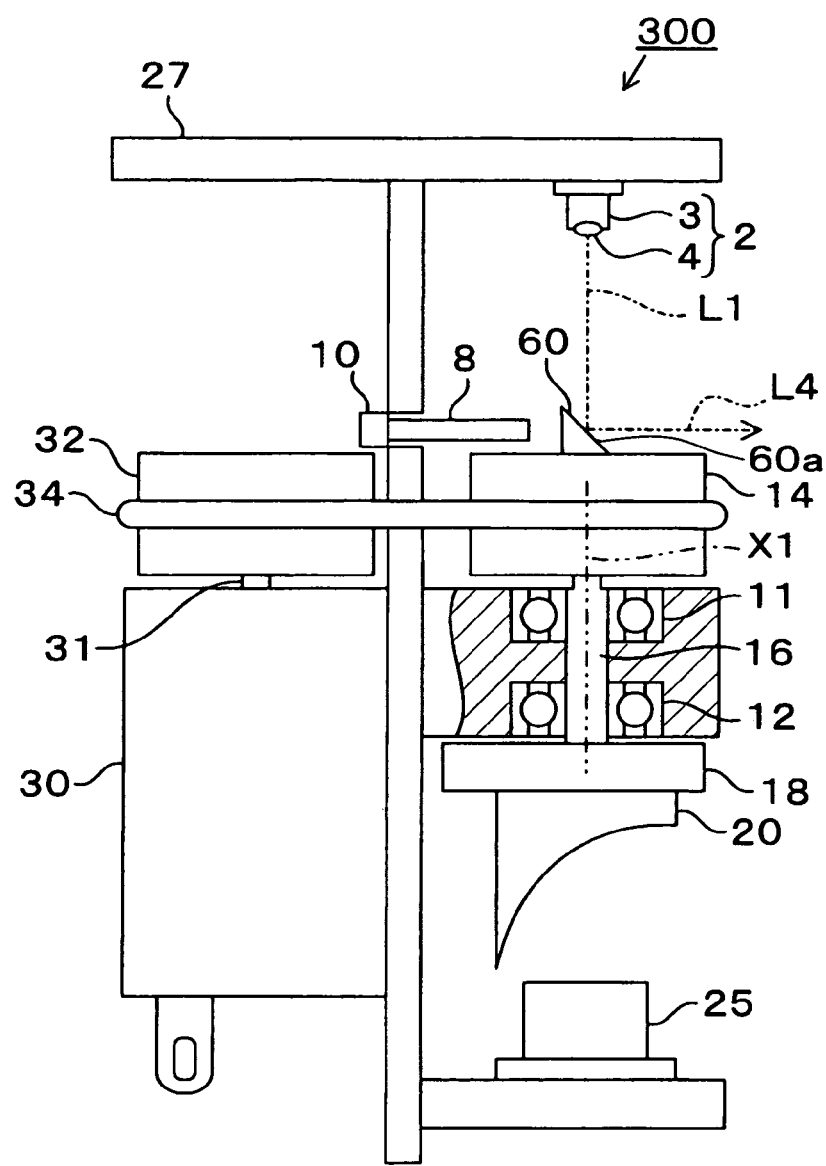
FIG. 6 is a diagram illustrating a location detection apparatus according to a third embodiment.

FIG. 6 illustrates a location detection apparatus 300 according to the third embodiment. A location detection apparatus of the third embodiment is different from that of the first embodiment in that, for example, the beam splitter 50 is replaced with a mirror 60. Like parts are referred by using like reference numerals between the first and third embodiments.

The location detection apparatus 300 includes the mirror 60, which is an example as a light output side reflector functioning as light outputs side reflecting means. A reflecting surface 60a of the mirror 60 is inclined at an angle of 45 degrees with respect to the rotation axis X1. In other words, an angle between the reflecting surface 60a and the optical axis of the light L1 is 45 degrees. The mirror 60 reflects the light L1 incident thereon so that a sum of an angle of incident and an angle of reflection is 90 degrees. Wherever the rotational position of the mirror 60 is, a direction of the light L4 from the mirror 60 after the reflection is perpendicular to the rotation axis X1. The light L4 from the mirror 60 after the reflection is moved on a virtual plane that is perpendicular to the rotation axis X1.

The light L4 reflected from the reflecting surface 60a of the mirror 60 can enter the optical fiber 8 when the rotational position of the mirror 60 is in a predetermined rotational position. Then the light is conducted toward the light reception sensor 10 through the optical fiber 8, and is received by the light reception sensor 10. The mirror 60 has the predetermined rotational position when, for example, the mirror 60 is rotated 180 degrees from a position illustrated in FIG. 6. In the present embodiment, the optical fiber 8 is an example a light conduction member and an example of a light conductor or light conducting means.

In the present embodiment, the light reception sensor 10 receives the light L4 each time the mirror 60 is rotated 360 degrees. The rotational position of the mirror 60 can be detected in the following ways. A one-rotation pulse signal, corresponding to 360 degrees rotation, is generated each time the light reception sensor 10 receives the light L4. The one-rotation pulse signal is frequency-divided by PLL or the like, and thereby, a pulse signal having multiple pulses that respectively correspond to multiple rotational positions is generated. The control circuit performs computation based on the pulse signal to calculate the rotational position. Alternatively, the rotational position of the mirror 60 may be obtained by utilizing both of (i) the detection of the light L4 by the light reception sensor 10 and (ii) the use of the rotary encoder as described in the second embodiment.

Fourth Embodiment

A fourth embodiment is described below.

Figure 7:
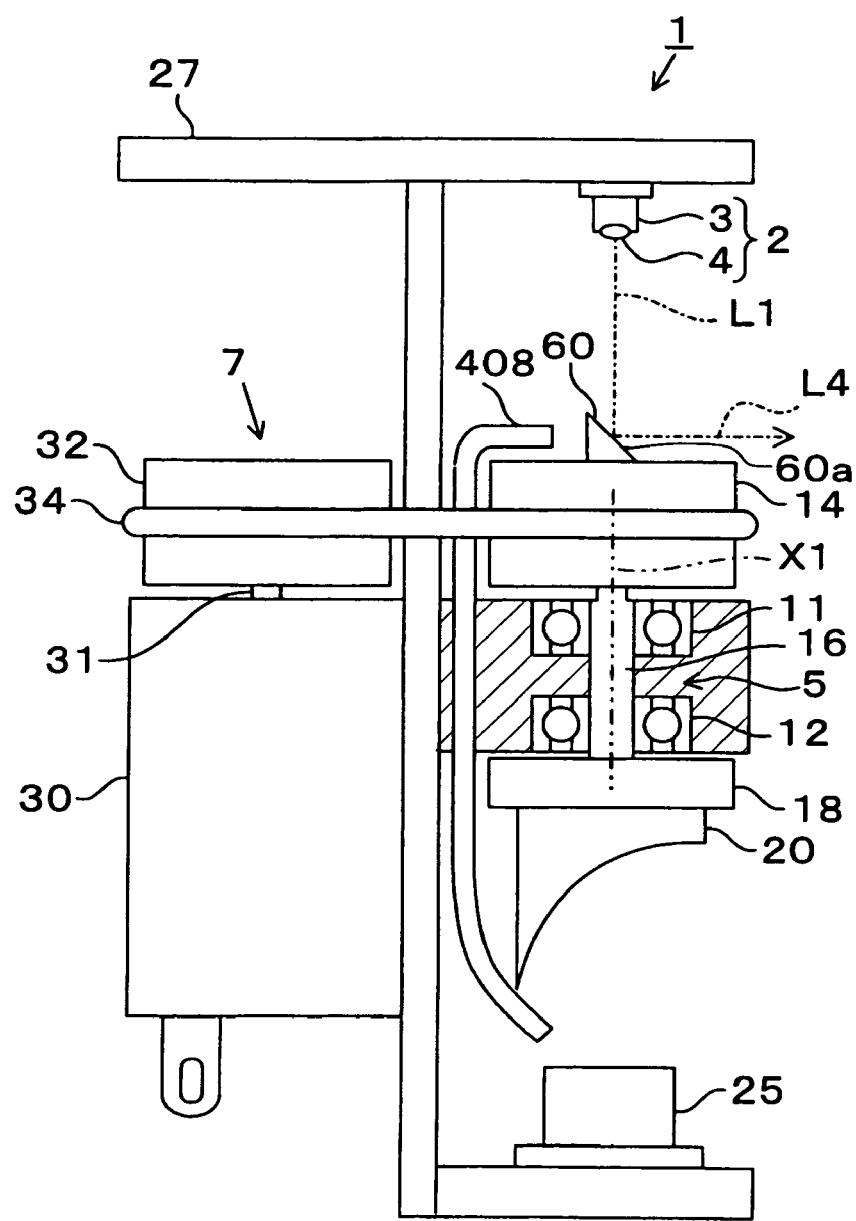
FIG. 7 is a diagram illustrating a location detection apparatus according to a fourth embodiment.

FIG. 7 illustrates a location detection apparatus 400 according to the fourth embodiment. The location detection apparatus 400 of the forth embodiment is different from the location detection apparatus 300 of the third embodiment in that, for example, the light reception sensor 10 is absent from the location detection apparatus 400, and the optical fiber 408 is extended so that a light output part of the optical fiber 408 is located proximal to the photodiode 25. Like parts are referred by using like reference numerals between the third and fourth embodiments.

The location detection apparatus 400 includes: a light source 2, a mirror 60 functioning as a light output side reflector or light output side reflecting means; a rotation mechanism 5; a motor functioning as a drive element or means; a photodiode 25 functioning as a first light receiving element or first light reception means; and a concave mirror 20 functioning as a light reception side reflector or light reception side reflecting means. The light source 2 generates light having a directivity for detection. The mirror 60 has a reflecting surface 60a for reflecting at least a part of the light from the light source to a space. The rotation mechanism 5 rotates the mirror 60 around the predetermined rotation axis X1. The motor 30 drives the rotation mechanism 5. When the object is irradiated with the light reflected from the reflecting surface 60a of the mirror 60, the concave mirror 20 reflects the light from the object to the photodiode 25. The photodiode 25 receives the light reflected from an object exiting in the space.

The location detection apparatus 400 includes a fiber 408. The light reflected from the reflecting surface 60a of the mirror 60 is conducted to the photodiode 25 through the fiber 408 when the rotational position of the mirror 60 becomes a predetermined rotational position. The fiber 408 is an example of the light conductor or the light conducting means. When the rotational position of the mirror 60 becomes the predetermined rotational position, an end part of the fiber 408 acting a light inlet part is located on a path of the light reflected from the mirror 60, and the fiber 408 conducts the incident light to the photodiode 25.

The control board 27, which functions as a rotational detector, detects the rotational position based on the reference position in a manner similar to that described in the above-described embodiments. Differences between the present embodiment and the above-described embodiments includes the followings: in the present embodiment, the reference position is set to a rotational position where the photodiode 25 receives the light outputted from the fiber 408; while in the first embodiment for example, the reference position is set to the rotational position where the light reception sensor 10 receives the light L3. To obtain the rotational position of the mirror 60, the control board 27 performs computation similar to that in the above-described embodiments based on the detection result of the photodiode 25, in other words, based on the reception result of the light outputted from the fiber 408.

According to the present embodiment, the reference position providing a reference for detecting the rotational position can be detected without using a complicated configuration. In particular, since the first light receiving element can play both roles in detecting an object in a space and in detecting the reference position, it is possible to further simplify a configuration for detecting the rotational position of the light output side reflector or reflecting means, and as a result, it is possible to provide a location detection apparatus with a smaller size and a lighter weight as a whole.

(Modifications)

The above-described embodiments can be modified in various ways.

In the above-described embodiments, the light source is illustrated as having a laser diode capable of outputting a laser beam. Alternatively, the light source may be another source capable of outputting light with directivity. For example, the light source may include a LED and a collective lens.

In the above-described embodiments, the optical fiber 8 is illustrated as a light conductor or light conducting means Alternatively, the light conductor may be another one that receives the light from the light output side reflector when the rotational position of the light output side reflector becomes the predetermined rotational position, and that conducts the received light to the second light receiving element. For example, the light conducting member may be a waveguide that is configured using two materials whose reflective indexes are different from each other.

While the invention has been described above with reference to various embodiments thereof, it is to be understood that the invention is not limited to the above described embodiments and constructions. The invention is intended to cover various modifications and equivalent arrangements. In addition, while the various combinations and configurations described above are contemplated as embodying the invention, other combinations and configurations, including more, less or only a single element, are also contemplated as being within the scope of embodiments.

What is claimed is:

1. A location detection apparatus for detecting an object existing in a space, comprising:
   a light source that generates light having a directivity for detection;
   a light output side reflector that is rotatable and has a reflecting surface, wherein the reflecting surface reflects at least a part of the light from the light source to the space;
   a rotation mechanism that rotates the light output side reflector around a predetermined rotation axis;
   a drive element that drives the rotation mechanism;
   a first light receiving element that receives the light reflected from the object existing in the space;
   a light reception side reflector that reflects the light from the object to the first light receiving element when the object is irradiated with the light reflected from the reflecting surface of the light output side reflector;
   a second light receiving element that receives and detects the light from the light output side reflector, and provides a detection result;
   a light conductor that conducts one of
      (i) the light reflected from the reflecting surface of the light output side reflector and
      (ii) the light transmitted through the reflecting surface of the light output side reflector toward the second light receiving element when rotational position of the light output side reflector becomes a predetermined position; and
   a rotational position detector that detects the rotational position of the light output side reflector based on the detection result of the second light receiving element, wherein
   the light output side reflector includes a beam splitter;
   the beam splitter includes a first reflecting portion and a second reflecting portion, the first reflecting portion having the reflecting surface, the second reflecting portion being a portion of the light conductor;
   the reflecting surface of the first reflecting portion reflects the part of the light from the light source so that the light reflected from the first reflecting portion travels in a first direction; and
   the second reflecting portion reflects the light transmitted through the reflecting surface of the first reflecting portion, so that the light reflected from the second reflecting portion travels in a second direction different from the first direction.

2. The location detection apparatus according to claim 1, wherein:
   the light reception side reflector includes a concave mirror.

3. The location detection apparatus according to claim 1, wherein:
   the light conductor includes a light conducting member;
   the light conducting member is located on a path of the light coming from the light output side reflector whose rotational position is the predetermined position; and
   the light conducting member conducts the light incident thereon to the second light receiving element.

4. The location detection apparatus according to claim 3, wherein:
   the light conducting member includes an optical fiber.

5. The location detection apparatus according to claim 3, wherein:
   the light conducting member includes a waveguide configured as a combination of multiple materials whose refractive indexes are different from each other.

6. The location detection apparatus according to claim 1, wherein:
   the predetermined position is a first position;
   the second light receiving element receives that light reflected from the second reflecting portion when the rotational position of the beam splitter becomes the first position; and
   the second light receiving element receives the light reflected from the first reflecting portion when the rotational position of the beam splitter becomes a second position, which is different from the first position.

7. The location detection apparatus according to claim 1, wherein:
   the light reception side reflector is connected with the light output side reflector;
   the light reception side reflector is rotatable around the predetermined rotation axis together with the light output side reflector;
   the drive element includes a motor;
   the motor includes a drive axis that is rotatable at a location spaced apart from the predetermined rotation axis;
   the light output side reflector and the light reception side reflector are integrated as a light output reception unit; and
   the light output reception unit includes a transmission mechanism that transmits a drive force of the drive axis.

* * * * *